US011256662B2

(12) United States Patent
Epiphaniou et al.

(10) Patent No.: US 11,256,662 B2
(45) Date of Patent: Feb. 22, 2022

(54) DISTRIBUTED LEDGER SYSTEM

(71) Applicant: UNIVERSITY OF WOLVERHAMPTON, Wolverhampton (GB)

(72) Inventors: Gregory Epiphaniou, Wolverhampton (GB); Prashant Pillai, Wolverhampton (GB); Amar Aggoun, Wolverhampton (GB)

(73) Assignee: UNIVERSITY OF WOLVERHAMPTON, Wolverhampton (GB)

( * ) Notice: Subject to any disclaimer, the term of this patent is extended or adjusted under 35 U.S.C. 154(b) by 192 days.

(21) Appl. No.: 16/533,160

(22) Filed: Aug. 6, 2019

(65) Prior Publication Data
US 2020/0042497 A1 Feb. 6, 2020

(30) Foreign Application Priority Data

Aug. 6, 2018 (GB) .................................... 1812770

(51) Int. Cl.
G06F 16/14 (2019.01)
G06F 16/182 (2019.01)
H04L 9/06 (2006.01)
H04L 9/32 (2006.01)

(52) U.S. Cl.
CPC .......... *G06F 16/152* (2019.01); *G06F 16/144* (2019.01); *G06F 16/182* (2019.01); *H04L 9/0637* (2013.01); *H04L 9/0643* (2013.01); *H04L 9/3218* (2013.01)

(58) Field of Classification Search
CPC ........ G06F 16/27; G06F 21/64; G06F 21/602; G06F 16/2365; G06F 16/9024; G06F 21/6245; G06F 16/137; G06F 16/182
See application file for complete search history.

(56) References Cited

U.S. PATENT DOCUMENTS

| 10,492,023 | B1 * | 11/2019 | Gurin | ................... H04W 4/021 |
| 2012/0240244 | A1 | 9/2012 | Orazi et al. | |
| 2019/0165943 | A1 * | 5/2019 | Chari | ........................ H04L 9/30 |
| 2019/0303951 | A1 * | 10/2019 | Bakalis | .............. G06K 7/10722 |
| 2019/0349426 | A1 * | 11/2019 | Smith | ..................... H04L 45/20 |

FOREIGN PATENT DOCUMENTS

CN 107918675 A 4/2018

OTHER PUBLICATIONS

Search Report for Application No. GB 1812770.4 dated Feb. 18, 2019, 3 pages.

* cited by examiner

*Primary Examiner* — Angelica Ruiz
(74) *Attorney, Agent, or Firm* — Alston & Bird LLP

(57) ABSTRACT

A system, method and apparatus for using a distributed ledger to control searching for information stored in a distributed storage system. The system comprises at least one apparatus, the system comprising: identifier storing means for causing, at least in part, an identifier to be stored in the distributed ledger, the identifier enabling a determination of where at least a portion of the information is stored in the distributed storage system in dependence on finding the identifier in the distributed ledger.

17 Claims, 3 Drawing Sheets

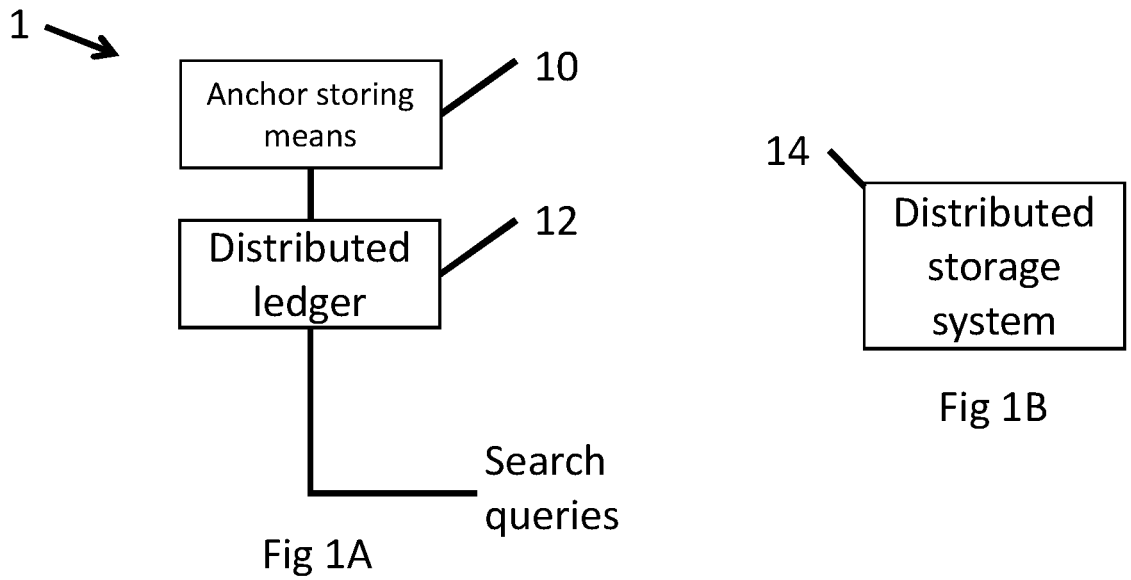
Fig 1A
Fig 1B
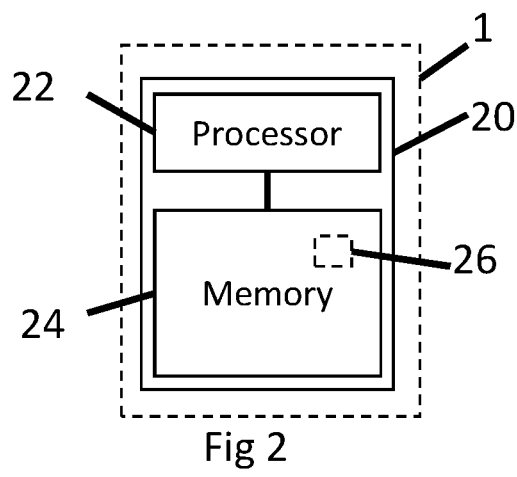
Fig 2
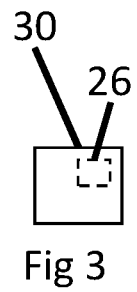
Fig 3

DISTRIBUTED LEDGER SYSTEM

CROSS-REFERENCE TO RELATED APPLICATIONS

This application claims priority to Great Britain Application No. 1812770.4, filed Aug. 6, 2018, the entire contents of which are incorporated herein by reference.

FIELD OF THE INVENTION

Embodiments of the present invention relate to a system for a distributed ledger. In particular, they relate to a system for using a distributed ledger to control searching for information stored in a distributed storage system.

BACKGROUND TO THE INVENTION

Distributed storage systems are a known form of computer storage system. Data storage is distributed over a plurality of node computers.

Distributed storage systems provide advantages over cloud storage systems including geographical scalability and redundancy.

Distributed ledgers are known. An example of a distributed ledger is a blockchain. A characteristic of a distributed ledger is that its records are (substantially) immutable.

It is known to use a distributed ledger in conjunction with a distributed storage system. Public blockchain services such as Siacoin® and Storj® use a blockchain to securely implement a business method.

The blockchain enables the business method by providing an immutable record of accounting transactions for services in connection with providing storage space.

In Storj, the locations of portions of information stored in the distributed storage system are identifiable from a distributed hash table.

However, aspects of the present invention use a distributed ledger for a distributed storage system to improve the security of the distributed storage system, while enabling a high searching speed, rather than for accounting or other business methods.

BRIEF DESCRIPTION OF VARIOUS EMBODIMENTS OF THE INVENTION

The invention is as defined in the claims.

According to some, but not necessarily all examples of the disclosure there is provided a system for using a distributed ledger to control searching for information stored in a distributed storage system, the system comprising at least one apparatus, the system comprising: identifier storing means for causing, at least in part, an identifier (e.g. anchor) to be stored in the distributed ledger, the identifier enabling a determination of where at least a portion of the information is stored in the distributed storage system in dependence on finding the identifier in the distributed ledger.

This provides the advantage of improved security. This is because the location of stored information cannot be determined until the distributed ledger has been searched.

The term 'identifier' is used interchangeably with the term 'anchor' herein.

According to some, but not necessarily all examples of the disclosure there is provided a system comprising at least one apparatus, the system comprising: identifier storing means for causing, at least in part, an identifier (e.g. anchor) to be stored in a distributed ledger, the identifier enabling a determination of where at least a portion of information is stored in a storage system.

Aspects of the invention relate to a system, and apparatus, a method, a computer program, and a computer-readable storage medium which may be non-transitory.

BRIEF DESCRIPTION OF THE DRAWINGS

For a better understanding of various examples of embodiments of the present invention reference will now be made by way of example only to the accompanying drawings in which:

FIG. 1A illustrates an example of functions of a system; and FIG. 1B illustrates an example of a distributed storage system;

FIG. 2 illustrates an example of hardware of a system;

FIG. 3 illustrates an example of a non-transitory computer readable storage medium;

DETAILED DESCRIPTION OF VARIOUS EMBODIMENTS OF THE INVENTION

Figure 4:
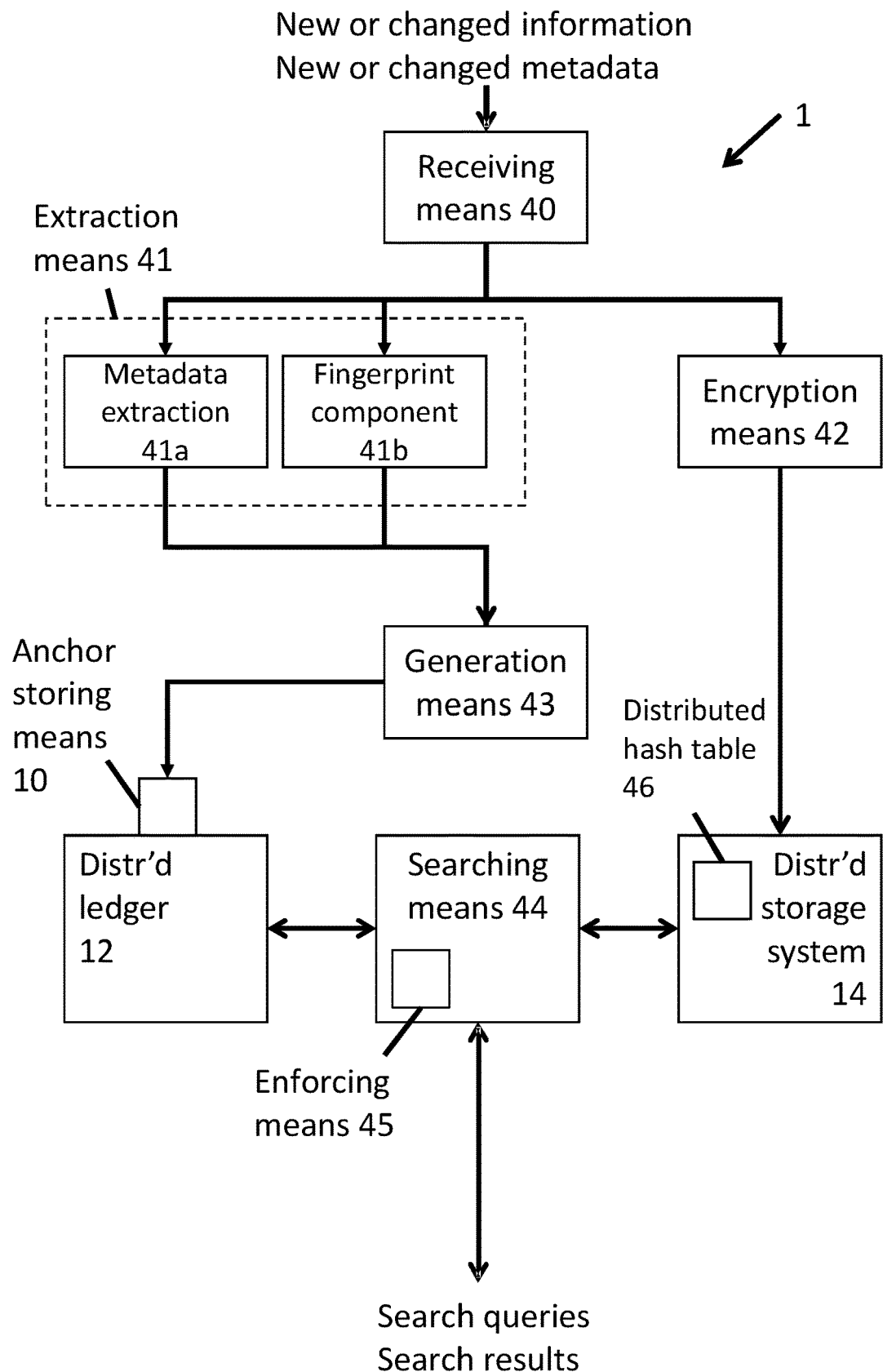
FIG. 4 illustrates another example of functions of a system.

The figures illustrate a system 1 for using a distributed ledger 12 to control searching for information stored in a distributed storage system 14, the system 1 comprising at least one apparatus 20, the system 1 comprising: identifier storing means 10 for causing, at least in part, an identifier to be stored in the distributed ledger 12, the identifier enabling a determination of where at least a portion of the information is stored in the distributed storage system 14 in dependence on finding the identifier in the distributed ledger 12.

The identifier is expressed herein as an anchor. The identifier storing means is expressed herein as an anchor storing means.

FIG. 1A shows the distributed ledger 12 and the anchor storing means 10 (anchor storer). The system 1 may be configured to implement the functionality of at least the anchor storing means 10. FIG. 1B shows the distributed storage system 14.

In some examples, the distributed ledger 12 may comprise the anchor storing means 10. The anchor storing means 10 may be any means that causes transactions to be added to the distributed ledger 12.

The system functionality may be comprised within the distributed storage system 14 or the distributed storage system functionality may be comprised within the system 1. In some examples, the system functionality may be supplied separately as an add-on or software update to an existing distributed storage system.

The system 1 may comprise its own distributed ledger or may leverage an existing distributed ledger 12 associated with the distributed storage system 14.

An example implementation of the distributed ledger 12 is Hyperledger®. The distributed ledger 12 may be implemented using the Hyperledger Fabric tool. Hyperledger Fabric uses container technology to host smart contracts called "chaincode", for the application logic of the system. HyperLedger Fabric is modular and enables plug-and-play addition of components.

The system 1 comprises at least one apparatus 20 responsible for implementing the functionality defined herein. The apparatus 20 may be a computer. The apparatus 20 may be one of the nodes that stores data in the distributed storage system 14, or a different node. The apparatus 20 may be a trusted node.

The functionality of the system 1 may be implemented in hardware and/or software. The blocks of the FIGS. 1A, 1B and 4 represent functions. Each function may be carried out by one apparatus 20 or distributed across multiple apparatus. One apparatus may perform one of the functions or multiple ones of the functions.

FIG. 2 illustrates an example physical implementation of the system 1 comprising the at least one apparatus 20. The apparatus 20 of FIG. 2 comprises at least one processor 22; and at least one memory 24 electrically coupled to the processor 22 and having instructions 26 (e.g. a computer program) stored therein, the at least one memory 24 and the instructions 26 configured to, with the at least one processor 22, implement the functionality of at least a portion of the system 1 described herein and cause at least a part of any one or more of the methods described herein to be performed.

In some examples, the term 'means' used herein, for performing a function, corresponds to: at least one processor 22; and at least one memory 24 electrically coupled to the processor 22 and having instructions 26 stored therein.

FIG. 3 illustrates an example of a non-transitory computer-readable storage medium 30 comprising the computer program 26.

The distributed storage system 14 will be defined. The distributed storage system 14 is for storing any information, such as files or records. The distributed storage system 14 may be applicable to any information having any cognitive meaning.

The present invention is particularly useful for, but not exclusively for, distributed storage systems containing sensitive or high-security information, such as serious offender information, health information, voter information, etc.

The distributed storage system 14 may be configured to segment (e.g. 'chunk') the information. The distributed storage system 14 may be configured to store the segments of the information in different locations in the distributed storage system 14.

The different locations may comprise different nodes of a computer network implementing the distributed storage system 14, the different nodes storing different segments. The well understood meaning of 'node' in computer networking is intended.

In further examples, different locations may correspond to different memory devices on a single node. Different locations may even correspond to different partitions of a single memory device.

The distributed storage system 14 may be configured to encrypt the segments or information. The encryption method used may be symmetric or asymmetric.

The distributed storage system 14 may support a plurality of different encryption methods.

The segments may be padded to conceal the file sizes of the segments.

The use of one or more of segmentation, encryption, padding, or other security increasing means, will cause the segments to be stored such that the portion of the information stored in the segment is substantially impossible (e.g. computationally prohibitively expensive) to convert back into an interpretable format by the node hosting the segment, or by any other unauthorized party.

The stored segments may also not reveal the locations of other segments. The locations of segments are identified elsewhere, such as in a table (e.g. distributed hash table), in accordance with various aspects of the present invention.

The segments may be replicated across several locations for redundancy.

Proof of possession of the information may be required before a node and/or user is permitted to identify the locations of segments and/or decrypt the segments.

FIG. 1A also illustrates the system 1 comprising anchor storing means 10, enabling the distributed ledger 12 to be used to control searching for information stored in the distributed storage system 14.

The distributed ledger 12 will be defined. In some, but not necessarily all examples, the distributed ledger 12 is a private distributed ledger. The private distributed ledger 12 may be a private permissioned distributed ledger.

However, in other examples the distributed ledger 12 may be a public distributed ledger, or even a distributed ledger with a public component and a private component.

The distributed ledger 12 may comprise at least one blockchain. In other examples, the distributed ledger 12 may be another distributed ledger than blockchain that provides a substantially immutable record of transactions associated with the distributed storage system 14.

For example, another suitable distributed ledger may comprise a directed acyclic graph which is substantially immutable and links transactions rather than blocks of transactions.

In federated network implementations, different networks of the federated network may implement, at least in part, the system 1. Therefore, multiple distributed ledgers may be in operation across the federated network.

Depending on permissions, one or more networks of the federated network may have access to information from another federated network. Therefore, a distributed ledger 12 may be accessible to nodes from different networks of a federated network. A node of a particular network of a federated network may have access to different distributed ledgers in different networks of the federated network.

Transactions recorded on the distributed ledger 12 include transactions between a user/node and the distributed storage system 14.

Example transactions include accessing the information, modifying the information, creating the information, etc.

The distributed ledger 12 therefore may act as a record of at least the occurrence of the transactions, and optionally may comprise additional information about the transactions, described later.

In the example of a private permissioned distributed ledger, the registration of transactions or blocks of transactions on the distributed ledger 12 may be the responsibility of at least one trusted apparatus, such as the apparatus 20 shown in FIG. 2.

The distributed ledger 12 may be managed using peer-to-peer architecture. This may provide for a secure database which does not require data to be centrally stored. The distributed ledger 12 may be non-mineable, i.e. no proof of work required, to save energy.

In other implementations, the registration of transactions or blocks may be the responsibility of nodes which the transactions relate to.

If the distributed ledger 12 is a blockchain, the system 1 and/or distributed ledger 12 may comprise block writing means (block writing component) configured to write blocks to the distributed ledger 12.

Blocks may relate to a plurality of transactions. A current block may be written when enough transactions have occurred so that the block is full. The current block may have a predefined size. To write a current block, the block writing means may identify a hash in common between the current block and an existing block in the blockchain. This may cause the current block to be linked to the existing block.

The block writing means may generate a hash for the current block, to link to a next block. The block writing means may create the new block for future transactions. The new block may be linked to the current block using the generated hash.

The blocks may be linked by hashes as described above, or any other data sensitive to the integrity of the block which makes the distributed ledger 12 substantially immutable.

According to various aspects of the present invention, it is necessary (but not necessarily sufficient) to search the distributed ledger 12 to enable identification of the location of the information (i.e. the segment locations).

This improves the security of searching, because the distributed ledger 12 is substantially immutable. Rather than using the distributed ledger 12 for accountancy, the distributed ledger 12 is used to control searching security.

In an example, the distributed ledger 12 may be configured to store information that is necessary for locating where the information is stored in the distributed storage system 14.

The anchor storing means 10 is responsible, at least in part, for providing this functionality to the distributed ledger 12. The anchor storing means 10 is configured to cause, at least in part, an anchor to be stored. A stored anchor comprises data that enables a determination of where at least a portion of the information is stored in the distributed storage system 14.

In other words, finding the stored anchor in the distributed ledger 12 enables a determination of location information, the location information identifying where the at least a portion of the information is stored in the distributed storage system 14.

In an example implementation, the anchor may comprise a hash of the information. The anchor may comprise an encrypted hash of the information. Finding the anchor and determining the hash may enable the location of the information to be found using a distributed hash table (DHT) or the like.

As an alternative to using a DHT, the distributed ledger 12 may comprise the location information associated with the anchor, without the need for a DHT.

FIG. 4 illustrates an example of the system 1 with additional optional components.

In summary, the additional components optionally comprise receiving means 40 (e.g. receiving component) for receiving data. The additional components optionally comprise extraction means 41 (extraction engine) for extracting parameters from the data which may feed into anchor generation. The additional components optionally comprise encryption means 42 (encryption component) for encrypting the information for storage in the distributed storage system 14. The additional components optionally comprise generation means 43 (anchor generation engine) for generating the anchor. The additional components optionally comprise searching means 44 (anchor search component) for searching the distributed ledger 12 and/or distributed storage system 14 in response to search queries. The additional components optionally comprise enforcing means 45 (enforcing component) for enforcing at least one requirement associated with searching for the information.

FIG. 4 shows the distributed storage system 14 and the distributed ledger 12 comprised as part of the system 1, although alternative arrangements as described earlier are equally applicable.

The components of the system 1 may be comprised in a single node or distributed over a plurality of networked nodes.

In detail, the receiving means 40 is for receiving data associated with information that is stored or is to be stored in the distributed storage system 14.

The data may comprise the information itself, for example the file contents or the actual record. The data may comprise data about the information such as metadata. The data may comprise both the information and the metadata in some examples.

The receiving means 40 may be configured to receive the data in response to an event associated with the information. The event may comprise, for example, accessing the information, modifying the information, creating the information, or a combination thereof. The event may be triggered by the actions of a node and/or a user.

Alternatively or additionally, the receiving means 40 may be configured to receive the data in response to an event associated with the system 1 rather than an event associated with the information. The event associated with the system 1 may comprise, for example, a periodic check or audit, access to the system 1 by a user and/or a node, or any other event.

The system 1 may be configured to authenticate a node/user before they are allowed to change information in the distributed storage system 14 and/or update information in the distributed storage system 14.

The manner of authentication may depend on a security policy defined by the implementation of the system 1, e.g. password based, multi-factor, etc. The authentication method may be the same as or different from any authentication used for authenticating searchers, discussed below.

The system 1 may be configured to determine whether the data indicates that the distributed storage system 14 needs to be updated, e.g. the data/information has changed or is new.

If the data has not changed, the system 1 may discard the received data without updating an anchor.

If the data has changed or is new, the distributed storage system 14 may need to generate a new anchor.

If the metadata has changed, an existing record of the information in the distributed storage system 14 may need to be updated depending on a security policy. Whether the update is required may depend on which metadata has changed.

If the information (e.g. file contents) has changed, an existing record of the information in the distributed storage system 14 may be updated. A new anchor may be generated.

If the information is new, the new information may be stored in the distributed storage system 14. A new anchor may be generated.

As mentioned above, a new anchor is required when the data and/or information has changed. The generation means 43 is configured such that the change of the data causes a new anchor to be generated.

If there is an existing anchor for a pre-changed version of the data, the new anchor will be different from the existing anchor. The generation means 43 may be configured such that the new, different anchor and the previous anchor are substantially uncorrelatable, to protect from hacking.

The inputs into anchor generation will now be described.

At least a portion of the anchor may be dependent on the data. References to 'the anchor' refer generically to the whole anchor or to a portion of the anchor.

The extraction means 41 may be configured to extract parameters from the data which are input into the generation means 43.

In some examples, the dependency of the anchor on the data means that inputting two identical sets of data to the generation means 43 may cause the anchor to be the same. However, if any arbitrary portion of the data is different, the anchor will be different and substantially uncorrelatable.

The anchor needs to be unique to the information. The system 1 may be configured to never generate two identical anchors. The anchor may conceal the integrity of the information to which it pertains.

The anchor may be dependent on the metadata. The extraction means 41 optionally comprises a metadata extraction engine 41a for receiving the metadata or extracting metadata from the data if necessary.

The metadata which affects the anchor may comprise temporal information associated with creation of the information, for example a timestamp on which the information was created.

The metadata which affects the anchor may comprise temporal information associated with modification of the information, for example a timestamp on which the information was modified.

The metadata which affects the anchor may comprise temporal information associated with access of the information, for example a timestamp on which the information was accessed by a node and/or by a user.

The metadata which affects the anchor may comprise identity information associated with an identity of an accessor of the information. Identity information may comprise a user identifier identifying a user who accessed the information. Identity information may comprise a node identifier identifying a node which was used to access the information, such as an IP address.

The metadata which affects the anchor may comprise temporal information associated with identity information associated with an identity of a creator of the information, for example a user identifier of the creator user, or a node identifier of the node associated with the creation.

The metadata which affects the anchor may comprise encoding information associated with how the information is encoded, for example a file type identifier.

The metadata which affects the anchor may comprise size information associated with a size of the information, for example a file size or file size on disk.

The metadata which affects the anchor may be associated with a master file table, or its equivalent for different file systems.

The integrity of the information itself (e.g. file contents or record to which the metadata pertains) may affect the anchor. The extraction means 41 optionally comprises a fingerprint component 41b which generates a fingerprint of the information. The fingerprint may comprise a hash or equivalent.

In an example implementation, a generated anchor comprises a hash of one or the combination of the metadata and file contents (fingerprint). The hash may then be encrypted for storage in the distributed ledger 12.

Therefore, if the information or a segment of the information is somehow hacked and any arbitrary portion of it is changed, the portion of the anchor will be different and substantially uncorrelatable with its previous portion.

The above provides a non-exclusive list of examples of different categories of data which could affect anchor generation. The choice of which data to use may depend on a security policy implemented in the system 1.

For example, if it is permitted to read the information without it generating an anchor and associated transaction in the distributed ledger 12, a change of the temporal information metadata associated with access may not change the anchor. If certain metadata changes are allowed without anchor changes, the number of anchor generations and the rate of growth of the distributed ledger 12 may be reduced.

In some examples, the system 1 may provide an administrator user interface allowing changes to the definitions of which data affects anchor generation. For example, an administrator may be able to change a security policy to change whether a particular metadata type causes generation of a different anchor. The user interface may comprise at least one apparatus such as described above, with a man-machine interface such as a display and input device (e.g. keyboard).

In view of the above disclosure, it would be appreciated that the system 1 is capable of generating a new anchor for stored information each time a change occurs that requires the information in the distributed storage system 14 to be updated.

Once an anchor has been generated, the anchor may be stored in the distributed ledger 12 by the anchor storing means 10, defined below.

The anchor storing means 10 comprises any means that causes, at least in part, the generated anchor to be added as at least part of a transaction to the distributed ledger 12.

Although the anchor storing means 10 is illustrated as a separate functional block in FIG. 4, the general functionality of the anchor storing means 10 could be found in one or more of: the generation means 43; the distributed ledger 12.

The anchor may be encrypted for storage in the distributed ledger 12. The key may be maintained by the distributed ledger 12 or elsewhere in the system 1. In some examples, the anchor may comprise the key.

Additionally or alternatively, the anchor may be appended to the key. Each key stored in the distributed ledger 12 may comprise multiple anchors appended to it, if the same key was used to generate multiple anchors. Once the key is identified and its appended anchors is/are decrypted, a specific required anchor can be located based on a search query that identifies the anchor or identifies other stored information appended to the anchor that enables the anchor to be identified in a search (e.g. metadata).

In an example implementation, an authorized searcher can decrypt the anchor by being provided with an access key matching the key used to encrypt the anchor, to obtain the hash required for using a DHT 46 to find the location information. The access key may be provided to the searcher as part of their authentication process to denote their level of authorization, and the access key may be incapable of decrypting anchors in the distributed ledger 12 that are not permitted to be accessed based on the searcher's authorization level.

This improves security and enables fast searching because many anchors will be 'skipped' as part of a search process.

In another example, the DHT 46 may be a distributed anchor table and finding the anchor may be sufficient to use the distributed anchor table. Encryption of anchors may be optional.

The DHT 46 is shown implemented outside the distributed ledger 12 but may be implemented elsewhere in other examples, such as in the distributed ledger 12.

In some, but not necessarily all examples the anchor may comprise additional information associated with each stored anchor. In other examples the additional information may be separate from the anchor but associated with the anchor.

Optionally, the additional information may comprise metadata associated with the information. The metadata may comprise some or all of the metadata described above for anchor generation. This metadata, such as filename, may enable searching for the anchor using metadata-identifying search queries.

Optionally, the additional information may comprise information associated with auditability. This may indicate what caused transactions. For example, the auditability information may indicate whether the information was modified, created or viewed. The auditability information may identify a user, node and/or timestamp. This improves the ability of the distributed ledger 12 to provide a record of use of the distributed storage system 14. Optionally, the additional information may comprise information associated with accountability, in further examples.

Optionally, the additional information may even comprise information which enables a specific block of a blockchain-based distributed ledger, containing the anchor, to be identified. The searching means 44 may be configured to skip to the relevant block for a search, using this information provided to the searching means 44 in advance.

At least some of the additional information may be encrypted.

The anchor may be stored as any data structure, such as a string, array, list, table, etc. The anchor, and indeed the distributed ledger 12, does not comprise the information (actual file contents) or its segments thereof.

To control the storage space required by the distributed ledger 12, and the searching speed, the lengths/storage space of the anchors may be limited. For example, the length/storage space of the anchor may be block size dependent. The anchor length may correspond to the number of anchor spaces available in a block.

The components for controlling searching for information will now be described.

The searching means 44 of the system 1 of FIG. 4 is configured to search the distributed ledger 12 for the anchor in response to a search query.

The searching means 44 comprises enforcing means 45 for enforcing at least one requirement associated with searching for the information. The requirement may be comprise the authorization requirement and/or an authentication requirement.

The enforcing means 45 may enforce an authentication requirement. The enforcing means 45 may implement zero-knowledge proof authentication. In a specific example, the system 1 may implement a non-interactive zero-knowledge proof scheme. In other examples, the system 1 may support other methods of searcher authentication such as passwords or multi-factor authentication.

The enforcing means 45 may enforce an authorization requirement. The level of authorization of the searcher may be embedded in the authentication process or embedded into a search process. For example, the enforcing means 45 may provide an access key to the searcher for decrypting anchors. The access key or whether it is provided may correspond to the level of authorization of the searcher. The access key may match key(s) of encrypted anchor(s) that are accessible for the level of authorization of the searcher, and not match the key(s) of anchor(s) that are for higher levels of authorization only.

In a federated network, information exchange between networks of the federated network may be restricted depending on policy. Therefore, a level of authorization of a particular searcher may depend on which network of the federated network they are associated with.

The searching means 44 may be configured to receive a user defined search query entered via a user interface, by a user using a node. In some examples, the search query may be a node defined search query.

The system 1 may be configured such that a searcher can only enter a search query once authenticated to use the system 1.

The user defined search query may not comprise the anchor. The user defined search query may define an identifier of the information, such as metadata (file name etc).

The searching means 44 may be configured to define a search query for searching the distributed ledger 12 for the anchor, from the user defined search query.

The search query for searching the distributed ledger 12 may comprise the access key. Using this access key, the distributed ledger 12 is searched to locate the anchor or a plurality of anchors comprising the anchor.

The anchors may be found by the search based on whether the access key can decrypt the anchor, for example whether the access key matches the key that was used for encryption. The enforcing means 45 is responsible for testing whether anchors can be matched to the access key. Therefore, the enforcing means 45 controls which anchors meet the requirement (e.g. authorization requirement) and will therefore be returned in response to a search of the distributed ledger 12.

If the key decrypts multiple anchors, the specific anchor may be found using any terms in the search query that are searchable terms in the anchor (e.g. meta-data, identifier of the anchor itself).

It would be appreciated that other means of searching are possible. For example, in examples with or without encryption and an access key, the search query may know the anchor in advance and seek a match in the distributed ledger 12. Finding a match enables progress to the next stage—use of the DHT 46. Whether a match is found may be controlled by the enforcing means 45.

However, the access key approach is fast and secure. Checking the access key against records in the distributed ledger 12 is a very fast process that can skip large groups of records. Further, even if the anchor is known in advance, a key mismatch will ensure that the anchor is not findable. Unauthorized searchers may be unable to verify whether an anchor even exists, so the existence of the data in the distributed storage system may be difficult to determine for unauthorized users.

The searching means 44 and/or the enforcing means 45 may comprise a self-executing contract. The self-executing contract may be a smart contract. In an example implementation, the smart contract may be implemented using 'chaincode' for the Hyperledger Fabric.

Once a match has been identified with an anchor by the searching means 44, the location of the information is possible to determine using the DHT 46. For example, the access key may decrypt the anchor to extract the hash, then the hash is input into the DHT 46 to determine the location information.

The location information may be used to locate the information segments and transmit the information or segments to the searcher. Transmission of the information segments to be requestor may be achieved with existing protocols such as peer to peer protocols or other file transfer protocols. The information may be decrypted, for example by the encryption means 42.

Once the searcher has accessed the information, they may access (view) the information, modify the information, delete the information or copy the information in dependence on their authorization. If the changes are saved to the distributed storage system 14, and the user's actions have changed data that affects anchor generation, then a new anchor may then be generated as described earlier. Therefore, it would be appreciated that a continuous record of data changes is kept in this example.

To summarize various advantages of the system 1 described above, the system 1 primarily enables a higher level of information security. The immutable distributed ledger 12 must be searched to locate the stored distributed information. It is nearly impossible to change data associated with information in an unauthorized manner without leaving immutable evidence, such as 'breaking' a blockchain.

Further, if the searcher lacks sufficient authorization, they may be unable to verify that the information exists, as required in some high security implementations.

Further, searching a distributed ledger 12 tends to be slow. However, the system 1 supports a very high search speed due to the described implementation of the anchor, searching means 44 and the enforcing means 45.

Based on the above disclosure of the system(s), various methods are apparent.

One example method associated with the simplified system 1 of FIG. 1 comprises causing, at least in part, an anchor to be stored in the distributed ledger 12, the anchor enabling a determination of where at least a portion of the information is stored in the distributed storage system 14 in dependence on finding the anchor in the distributed ledger 12. The anchor storing means 10 may implement this functionality.

Figure 5:
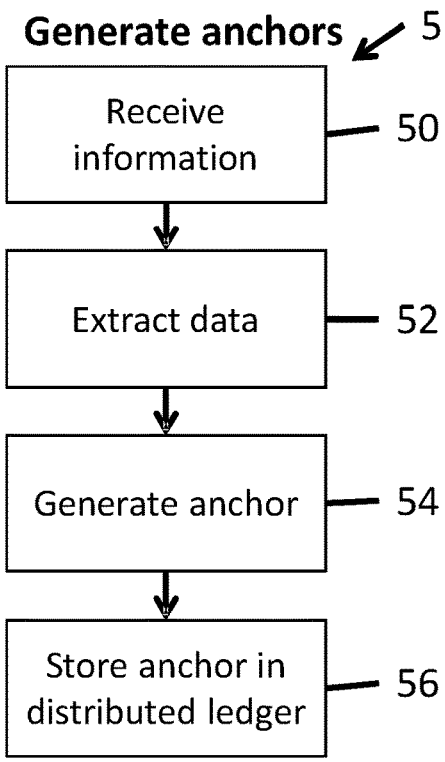
FIG. 5 illustrates an example anchor generation method.
Figure 6:
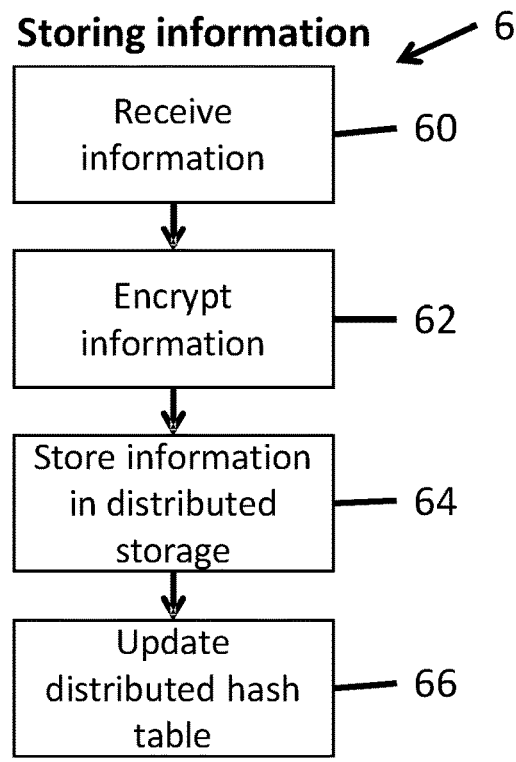
FIG. 6 illustrates an example information storing method.
Figure 7:
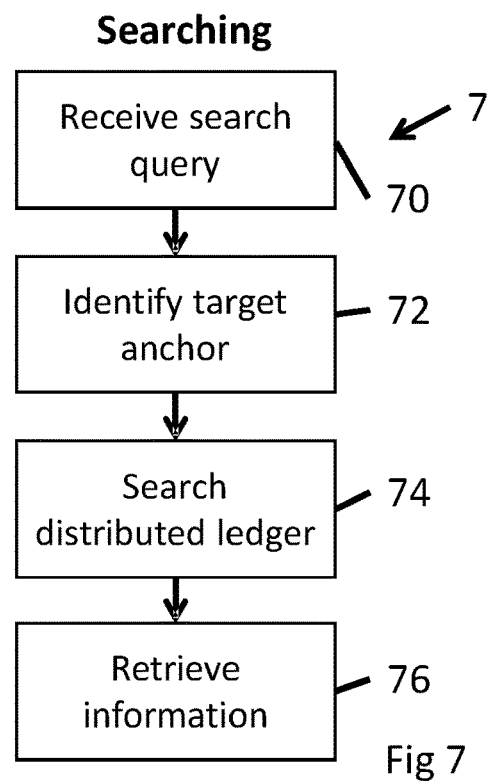
FIG. 7 illustrates an example searching method.

Other example methods associated with the more complex system 1 of FIG. 4 are shown in FIGS. 5-7.

FIG. 5 comprises an anchor generation method 5. At block 50, the method comprises receiving data associated with information stored or to be stored in the distributed storage system 14. The receiving means 40 may implement block 50.

Block 52 comprises extracting parameters from the data which the anchor is dependent upon. The parameters may comprise metadata and/or a fingerprint as described. The extraction means 41 may implement block 52.

The anchor generation method 5 may proceed to block 54 if the relevant data has changed as described earlier. If not, the anchor generation method 5 may terminate.

Block 54 comprises generating an anchor. The generation means 43 may implement block 54.

Block 56 comprises causing, at least in part, the anchor to be stored in the distributed ledger 12, in response to block 54. The anchor storing means 10 may implement block 56.

FIG. 6 comprises an information storing method 6. Block 60 may be the same as block 50.

Block 62 comprises encrypting the information. Block 62 may be executed if the relevant data has changed as described earlier. If not, the information storing method 6 may terminate. The encryption means 42 may implement block 62.

Block 64 comprises storing the encrypted information in the distributed storage system 14. Block 64 may comprise segmenting the information, and the other routine requirements for preparing information for distributed storage.

Block 66 comprises updating the DHT 46. If the anchor identifies a hash, the hash identified in the DHT 46 may be identical to the hash identified in the anchor. Block 66 may be implemented, at least in part, by the DHT 46 and the generation means 43.

Therefore, the distributed ledger 12 and DHT 46 are kept up to date.

FIG. 7 comprises a searching method 7. Block 70 comprises receiving a search query. The search query may be a user defined search query. The searching means 44 may implement block 70.

Block 72 comprises identifying at least a portion of an anchor related to the (user defined) search query. If no anchor is found related to the search query, the searching method 7 may terminate. The searching means 44 and anchor identifying means 47 may implement block 72.

Block 74 comprises searching the distributed ledger 12 for the anchor using the search query to enable the location information to be found. For example, a match may be sought, i.e. an anchor corresponding to a search query. In specific examples, a hash for the DHT 46 may be sought. The enforcing means 45 may enforce a requirement such as described above. If no match is found or the requirement is not met, then no search result will be returned to the searcher. If the requirement is met and a match is found, the search result is capable of being returned to the searcher. The searching means 44 may implement block 74.

Block 76 comprises retrieving the information from the distributed storage system 14 and enabling access to the information by the searcher. If a DHT 46 is used, the hash may be determined from the anchor. As described earlier, the segments may be transmitted to the searcher. The information may be decrypted. The DHT 46 and optionally the encryption means 42 may implement block 76.

The blocks illustrated in the FIGS. 1A, 1B, 4, 5, 6 and 7 may represent steps in a method and/or sections of code in the computer program 26. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the distributed storage system 14 may be a centralized storage system. Alternatively or additionally, the DHT 46 may be an anchor table.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A system configured to use a distributed ledger to control searching for information stored in a distributed storage system, the system comprising at least one apparatus, the apparatus comprising at least one processor and at least one memory electrically coupled to the processor and having instructions stored therein, the system comprising:
  an identifier storer configured to cause, at least in part, storage of an identifier in the distributed ledger, the identifier enabling a determination of where at least a portion of the information is stored in the distributed storage system in dependence on finding the identifier in the distributed ledger, wherein the identifier comprises data that is associated with location information identifying locations of segments of the information stored in the distributed storage system;
  an identifier search component configured to search the distributed ledger for the identifier in response to a search query, wherein a term in the search query is a term in the identifier stored in the distributed ledger; and
  an enforcing component configured to enforce at least one requirement associated with searching for the information, to control whether a search result is returned in response to the search query.

2. The system as claimed in claim 1, wherein the at least one requirement comprises an authorization requirement.

3. The system as claimed in claim 2, wherein at least part of the identifier is encrypted, and wherein the enforcing component is configured to determine whether an access key associated with a search query decrypts the encrypted at least part of the identifier.

4. The system as claimed in claim 1, wherein the at least one requirement comprises an authentication requirement using a zero knowledge proof scheme.

5. The system as claimed in claim 1, wherein the identifier search component is configured to search the distributed ledger for a match between the search query and the identifier.

6. The system as claimed in claim 5, wherein the identifier in the distributed ledger comprises the data.

7. The system as claimed in claim 5, wherein the data comprises metadata.

8. The system as claimed in claim 1, comprising:
  a receiving component configured to receive data associated with information stored in the distributed storage system or prior to the information being stored in the distributed storage system; and
  an identifier generation engine configured to generate the identifier, wherein at least a portion of the generated identifier is dependent on the data.

9. The system as claimed in claim 8, wherein the data is dependent on at least one of the following properties that cause the data to affect the identifier: metadata associated with the information; the integrity of the information.

10. A system as claimed in claim 9, wherein the metadata affects the identifier and comprises at least one of:
  temporal information associated with creation and/or modification of the information;
  temporal information associated with access of the information;
  identity information associated with an identity of an accessor and/or creator of the information;
  encoding information associated with how the information is encoded; or
  size information associated with a size of the information.

11. A system as claimed in claim 8, wherein a change of the data associated with the information causes generation of a different identifier by the identifier generation engine, compared to a previous identifier associated with a pre- changed version of the data, and wherein the different identifier and the previous identifier are substantially uncorrelatable.

12. A system as claimed in claim 8, wherein the receiving component is configured to receive the data in dependence on at least one of: access to the set of information; a change to the set of information; creation of the set of information.

13. A system as claimed in claim 1, comprising:
  a block writing component configured to write a block comprising a plurality of identifiers including the identifier to the distributed ledger when the block is full, generate data sensitive to the integrity of the contents of the block, create a new block for future identifiers, and link the new block to the written block using the generated data.

14. A system as claimed in claim 13, wherein the block writing component is implemented in a trusted at least one apparatus of the system, wherein the distributed ledger is a private permissioned distributed ledger.

15. A distributed storage system comprising the system as claimed in claim 1, wherein the system controls searching for information stored in the distributed storage system.

16. A method for using a distributed ledger to control searching for information stored in a distributed storage system, the method comprising:
  causing, at least in part, storage of an identifier in the distributed ledger, the identifier enabling a determination of where at least a portion of the information is stored in the distributed storage system in dependence on finding the identifier in the distributed ledger, wherein the identifier comprises data that is associated with location information identifying locations of segments of the information stored in the distributed storage system;
  causing, at least in part, searching the distributed ledger for the identifier in response to a search query, wherein a term in the search query is a term in the identifier stored in the distributed ledger; and
  causing, at least in part, enforcing at least one requirement associated with searching for the information, to control whether a search result is returned in response to the search query.

17. A non-transitory, computer-readable storage medium storing instructions thereon that, when executed by one or more processors, causes the one or more processors to carry out a method for using a distributed ledger to control searching for information stored in a distributed storage system, the method comprising:
  causing, at least in part, storage of an identifier in the distributed ledger, the identifier enabling a determination of where at least a portion of the information is stored in the distributed storage system in dependence on finding the identifier in the distributed ledger, wherein the identifier comprises data that is associated with location information identifying locations of segments of the information stored in the distributed storage system;
  causing, at least in part, searching the distributed ledger for the identifier in response to a search query, wherein a term in the search query is a term in the identifier stored in the distributed ledger; and
  causing, at least in part, enforcing at least one requirement associated with searching for the information, to control whether a search result is returned in response to the search query.

* * * * *